(12) United States Patent
Matero et al.

(10) Patent No.: US 7,689,236 B2
(45) Date of Patent: Mar. 30, 2010

(54) MEDIA DEVICE AND METHOD OF ENHANCING USE OF MEDIA DEVICE

(75) Inventors: Juha Matero, Oulu (FI); Jyrki Matero, Oulu (FI)

(73) Assignee: Nokia Corporation, Espoo (FI)

( * ) Notice: Subject to any disclaimer, the term of this patent is extended or adjusted under 35 U.S.C. 154(b) by 1413 days.

(21) Appl. No.: 11/082,678

(22) Filed: Mar. 17, 2005

(65) Prior Publication Data
US 2006/0209743 A1  Sep. 21, 2006

(51) Int. Cl.
  *H04B 15/00*  (2006.01)
  *H04B 7/00*  (2006.01)
  *H04W 4/00*  (2006.01)
(52) U.S. Cl. ............... 455/506; 370/310; 370/328; 370/389; 725/22; 725/39; 725/100; 725/135
(58) Field of Classification Search ........... 455/3.06, 455/506; 370/310, 328, 389; 725/22, 99, 725/100, 39, 135
See application file for complete search history.

(56) References Cited
U.S. PATENT DOCUMENTS

| 5,592,471 | A  | * | 1/1997 | Briskman ............... 455/506 |
| 7,079,807 | B1 | * | 7/2006 | Daum et al. ............ 455/3.06 |
| 2004/0198279 | A1 | | 7/2004 | Anttila et al. |
| 2004/0198217 | A1 | | 10/2004 | Lee et al. |
| 2006/0067260 | A1 | * | 3/2006 | Tokkonen et al. ........... 370/310 |
| 2006/0114893 | A1 | * | 6/2006 | Tokkonen et al. ........... 370/389 |
| 2006/0130102 | A1 | * | 6/2006 | Matero et al. ............... 725/100 |
| 2006/0168640 | A1 | * | 7/2006 | Anttila et al. ............... 725/135 |
| 2006/0174268 | A1 | * | 8/2006 | Matero ...................... 725/39 |
| 2006/0209743 | A1 | * | 9/2006 | Matero et al. ............... 370/328 |
| 2007/0011699 | A1 | * | 1/2007 | Kopra et al. ................. 725/22 |

FOREIGN PATENT DOCUMENTS

| JP | 2004282350 | 10/2004 |
| WO | 03090480 | 10/2003 |
| WO | 2004025906 | 3/2004 |
| WO | 2004073173 | 8/2004 |
| WO | 2005109687 | 11/2005 |

* cited by examiner

*Primary Examiner*—William D Cumming
(74) *Attorney, Agent, or Firm*—Ditthavong Mori & Steiner, P.C.

(57) ABSTRACT

A media device, a network element and a method of enhancing use of a media device are provided. The media device is configured to receive a broadcast media stream transmitted by a broadcast system at a given frequency and a service transmission over a radio interface of a cellular telecommunication system, the transmission being associated with the media stream and comprising information about frequencies used to transmit the media stream in different locations. The media device measures signal strength of the media transmission at the frequency the transmission is received and at least at one other frequency used for transmission of the transmission, compares the measured signal strengths and switches the reception of the media transmission to another frequency if the signal strength at said frequency is greater than the signal strength at the current frequency.

12 Claims, 3 Drawing Sheets

MEDIA DEVICE AND METHOD OF ENHANCING USE OF MEDIA DEVICE

FIELD

The invention relates to a media device and to enhancing use of a media device. The invention particularly relates to media devices configured to receive a broadcast media stream from a broadcast system.

BACKGROUND

Broadcasters, such as television and radio broadcasters, have taken steps forward to provide an audience with digital supplementary services, such as program information, news, weather information, competitions and other related contents, in addition to a traditional media stream. The digital supplementary services are usually delivered to the audience over the Internet using the audience's personal computers or other media devices capable of connecting to the Internet.

The audience is provided with more mobility by media devices of cellular telecommunication systems, which media devices are equipped with a receiver, such as an FM radio, for receiving media streams broadcast by broadcasters. Broadcasters typically provide Internet services, which can be accessed by media devices, such as one equipped with a WAP (Wireless Application Protocol), capable of connecting to such a service.

Typically, the frequency used to transmit a broadcast media stream varies, depending on a geographical location. Each broadcast transmitter has a given coverage area, and transmitters serving adjacent areas use different frequencies. Thus, the same broadcast media stream is transmitted on a predetermined number of frequencies, and these frequencies may be called parallel frequencies.

When a user of a media device tuned to a given broadcast stream travels from one geographical area to another, the quality of reception of the broadcast media stream deteriorates gradually as the distance between the broadcast transmitter and the media device increases.

A media device cannot automatically swap to a parallel frequency transmitting the media stream on a new location without information about the frequency. Thus, in the worst case, the broadcast media stream fades away while a supplementary service is still being delivered to the media device.

In prior art, some solutions have been presented to overcome this problem. One solution is to utilize RDS (The Radio Data System). In RDS, supplementary information is attached to the broadcast media stream. The supplementary RDS information comprises identification of the station or the media stream. Thus, the receiver is able to distinguish media streams from each other automatically. However, this requires that the receiver should be RDS compliant, i.e. equipped with suitable features to receive RDS transmission. Furthermore, the receiver must scan the available frequency range in order to detect a parallel frequency of the media stream currently being received.

Publication US 2004/0198217 discloses a follow-me broadcast reception system (FBRS). The document discloses a solution where a FBRS server maintains a history of a mobile user's location and the frequency to which the user's broadcast receiver was tuned. The solution utilizes this history information to resolve a parallel frequency. A drawback of this solution is the need to determine and store the location of the mobile user, and the need for a continuous connection between a server and a mobile user.

BRIEF DESCRIPTION OF THE INVENTION

An object of the invention is to enhance the use of a media device by providing an improved solution for monitoring and updating media transmission frequencies. According to an aspect of the invention, there is provided a method of enhancing use of a media device configured to receive a broadcast media stream transmitted by a broadcast system at a given frequency; the method comprising: receiving, over a radio interface of a cellular telecommunication system, a service transmission associated with the broadcast media stream, the service transmission comprising information about frequencies used to transmit the broadcast media stream in different locations; measuring signal strength of the broadcast media transmission at the frequency the media transmission is received and at least at one other frequency used for transmission of the media transmission, comparing the measured signal strengths; switching the reception of the media transmission to another frequency if the signal strength at said frequency is stronger than the'signal strength at the current frequency.

According to another aspect of the invention, there is provided a network element, comprising one or more servers, operationally connected to a broadcast system transmitting a broadcast media stream, and to a cellular telecommunication system, configured to store information about frequencies used to transmit the broadcast media stream in different locations, and to transmit over a radio interface of the cellular telecommunication system, a service transmission associated with the broadcast media stream, the service transmission comprising information about the frequencies.

The invention provides several advantages. The media device is aware of parallel frequencies, so when the signal quality of the received frequency deteriorates, no need exists to scan the available frequencies. Furthermore, no need exists for a continuous connection with a separate server. The media device needs no RDS functionalities, which would increase the power consumption of a mobile device.

LIST OF DRAWINGS

In the following, the invention will be described in greater detail with reference to the embodiments and the accompanying drawings, in which FIG. 1 illustrates an example of a system in which embodiments of the invention may be utilized;

DESCRIPTION OF EMBODIMENTS

Figure 1:
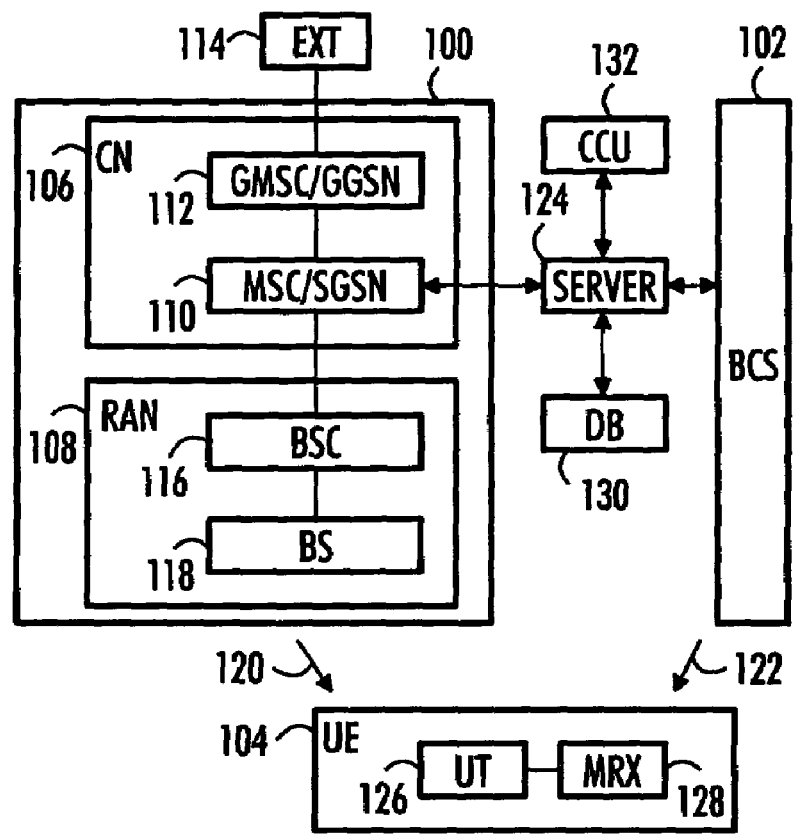

FIG. 1 illustrates an example of a simplified structure of a system in which embodiments of the invention may be utilized. The system comprises a communication network 100 of a cellular telecommunications system, a broadcast system 102, and a media device 104 of the cellular telecommunications system.

The cellular telecommunications system is based on, for example, a GSM (Global System for Mobile Communications) or UMTS (Universal Mobile Telecommunications System). The radio interface used in the communication between the communication network and the-media device may be realised using WCDMA (Wideband Code Division Multiple Access) technology, GPRS (General Packet Radio Service) or WLAN (Wireless Local Area Network), or any other similar services offering solution. The structure and functions of cellular telecommunications systems are known to a person skilled in the art, and not all network elements of the system are illustrated.

The communication network 100 provides the media device 104 with bi-directional communication services. The broadcast system 102 provides the media device 104 with a media stream 122 using, for example, a radio or television broadcast.

The communication network 110 may represent the fixed infrastructure of the cellular telecommunication system. The communication network 110 may comprise a core network (CN) 106 representing a radio-independent layer of the communication network 110, and at least one radio access network (RAN) 108. The core network 106 may include network elements of different generations of cellular telecommunications systems. The radio access network 108 provides the media device 104 with a radio interface using a radio access technology. The media device thus has a bi-directional radio connection 120 with the radio access network 108.

In the example shown in FIG. 1, the core network 106 is exemplified in terms of GSM terminology using both circuit-switched and packet-switched network elements. The packet-switched network elements are described in terms of a GPRS (General Packet Radio Service) system, which provides the media device 104 with access to external data networks over GSM and supports standard protocols, such as TCP (Transmission Control Protocol) and IP (Internet Protocol). The invention is not, however, restricted to the systems, division of systems, or protocols used in the system described in the examples, but can be applied to any cellular telecommunications system.

A center 110 represents a mobile services switching center (MSC) and a serving GPRS support node (SGSN) enabling circuit-switched and packet-switched signaling, respectively, in the cellular telecommunications system.

A function of the serving GPRS support node 110 is to transmit packets to and receive them from the media device 104 supporting packet-switched transmission. The serving GPRS support node 110 includes subscriber information and location information about the media device 104.

The core network 106 may also have a gateway unit 112 representing both a gateway mobile service switching center (GMSC) and a gateway GPRS support node (GGSN). The GMSC attends to the circuit-switched connections between the core network 106 and external networks (EXT) 114, such as a public land mobile network (PLMN) or a public switched telephone network (PSTN), and the GGSN attends to the packet-switched connections between the core network 106 and external networks 114, such as the Internet.

The center 100 controls the radio access network 108, which may comprise at least one base station controller (BSC) 116 controlling at least one base station (BS) 118. The base station controller 116 may also be called a radio network controller, and the base station 118 may be called a node B.

The system of FIG. 1 further comprises a server 124 connected to the communication network 100 and the broadcast system 102 for providing the media device 104 with a service associated with the media stream 122 by using the radio interface of the cellular telecommunication system. The server 124 may be a computer, such as a personal computer or a workstation with an interface to the communication network 100 and the broadcast system 102. The physical location of the server 124 is irrelevant as long as the required connections exist. The server 124 may comprise a database 130. The database 130 may comprise computer files containing the service contents.

The server 124 may be connected to the center 110, the gateway unit 112, the radio access network 106, or other parts of the communication network 100. The server 124 may be connected to the communication network 100 via an external network 114. In an embodiment, the server 124 communicates with the communication network 100 over the radio interface of the cellular telecommunication system.

The media device 104 comprises a user terminal 126 for communicating in the cellular telecommunication system using a radio interface provided by the base station 118. The media device 104 further comprises a broadcast media receiver 128, such as an FM receiver or a television receiver, for receiving a media stream 122 provided by the broadcast system 102.

The base station 118 may communicate with the media device 104 using GPRS, in which data is transferred in packets that contain address and control data, in addition to the actual contents data. Several connections may employ the same transmission channel simultaneously. This kind of packet switching method is suitable for data transmission where the data to be transmitted is generated in bursts. In such a case, it is not necessary to allocate a data link for the entire duration of transmission but only for the time it takes to transmit the packets. This reduces costs and saves capacity considerably during both the set-up and use of the communication network 100.

The server 124, for example, controls the contents flow between the media device 104 and the communication network 100. The server 124 may also facilitate a timed delivery of the contents of a service to the media device 104.

The media stream 122 is broadcast by the broadcast system 102. The media stream 122 may include, for example, a radio or a television program, a commercial or an announcement. The media stream 122 may include speech, music, or pictures. The contents of the media stream 122 are, however, irrelevant to the present solution. The media device is configured to receive the broadcast media stream 122 by the broadcast media receiver 128.

The media device may be provided with a service associated and/or synchronized with the broadcast media stream 122 transmitted by the broadcast system. In general, the service may provide the user of the media device with visual information related to the contents of the broadcast media stream 122. The service may be interactive. The service may include information about the music being played at the moment, a DJ's messages to the listeners, or the like. The signal may include any of these features alone or a combination thereof. The service may include information about deliverable or purchasable objects related to the media stream, such as ring tones, desktop wallpapers or logos.

The service may be provided to the media device 104 utilizing a communication channel parallel to the broadcast channel used in delivering the media stream 122 to the user. This is called a parallel channel operation. A logical address may be dedicated to the service 120 so that the service 120 may be accessed by using the logical address of a database 130 of the server 112. The contents of the service may vary as a function of time and possibly as a function of the contents of the media stream 122. The service 120 provides the user equipment 110 with a bit stream, the bit stream including information contents, such as graphical information, text information, audio information, a computer program, Braille, vibration, or any combination thereof. In an embodiment, the contents of the service 120 are displayed on a display of the user equipment 110.

A service provider is a party possessing rights for relevant digital contents of the service 120, a distribution system for providing the media device 104 with the service 120, and possibly capability to bill the user for the service 120. The service provider's delivery system is responsible for receiving and handling delivery requests, and for delivering the service 120 to the media device 104.

In the media device 104, the service provides an integrated user experience, allowing the user to start both listening to a media stream 122 and receiving the contents of the service relating to the media stream 122. The operation of the media is based on two channels, the broadcast channel and the parallel channel enabled by the cellular telecommunication system.

In an embodiment, the service concept may be called a visual radio. The broadcast system broadcasts a radio transmission 122 received by the media device 104. The DJ or announcer of the radio transmission may advertise the service realized by the parallel channel. The user of the media device may subscribe to the service by making contact with the server and downloading suitable data or information which enables the user's media device to receive the service. The data may be called associating data and it, may comprise information which provides a linkage between the service and the media stream and which identifies the service transmission.

The associating data may include the following types of information: a radio service address, a service identification, an object identification, a radio broadcaster identification number, a program identification number, a traffic announcement identification number, a traffic program identification number, a program item number, an emergency warning message, a music/speech indicator, radio frequencies utilized by a media stream in different locations, a program service name, a program type identification number, and a country code.

In an embodiment, the system comprises a contents creation unit (CCU) 132 connected to the server 124 and the broadcast system 12 for providing the service with contents. The contents creation unit 132, which can also be called a visual radio tool in some applications, may be used to create a service contents presentation to be displayed on the media device 104. The contents creation unit 132 may be located in and integrated into the broadcast system 102, or into the server 124.

The contents creation unit 132 may allow a broadcast system to create a visual presentation and manage the contents flow shown on the screen of the media device 104 in synchronization with the media stream 122.

The contents creation unit 132 may also define timing to display the contents of the service in the media device 104 in relation to a broadcast media stream timeline.

The service may include detailed information about the contents of the broadcast transmission, such as data about programs or music tracks played in the transmission. The data may comprise names of programs, names of music tracks played in programs, music category of a music track, artists playing in a music track, and a name of an album in which a music track may be found. The data may comprise starting and ending times of programs and each music track played in the programs.

FIG. 1 shows a broadcast system 102 and a server 124. In practice, several broadcast systems may exist in the same area and each broadcast system may have a server of its own. The servers are connected to the communication network 100 in a manner similar to that in connection with the server 124. In an embodiment, the server 124 may be connected to several broadcast systems. In another embodiment, the broadcast system 102 may transmit several broadcast media streams.

Figure 2:
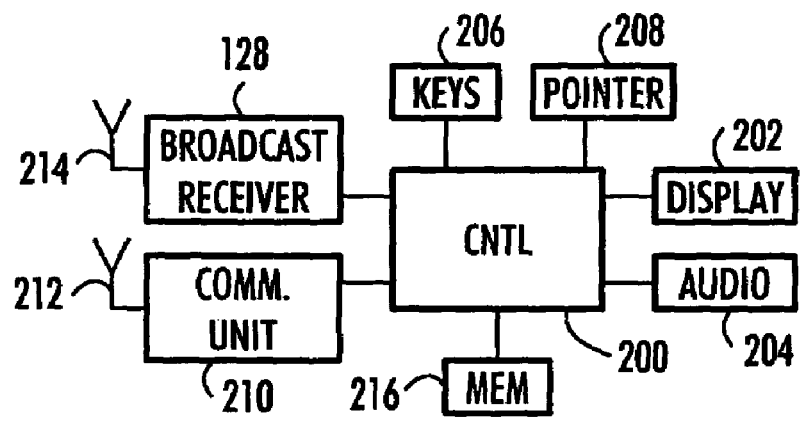
FIG. 2 illustrates an example of a media device.

With reference to FIG. 2, examine an example of a media device to which embodiments of the invention can be applied. The media device comprises a controller 200, typically implemented with a processor, a signal processor or separate components and associated software. The controller controls the operation of the device, starts and executes tasks and applications and takes care of input/output functions required by the applications. The device further comprises a display 202. The display is typically configured to display graphics and text. The device may also comprise an audio interface 204, which may be realized with a speaker or a headset and a microphone, for example. The device may further comprise a keypad 206 and a pointer device 208, such as a mouse, a track stick or a touch-pad. Depending on the type of the device, the type and number of user interface parts may vary.

The media device also comprises a communication unit 210 implementing the functions of a user terminal 126, including speech and channel coders, modulators and RF parts. The device may also comprise an antenna 212 connected to the communication unit. The device may also comprise a broadcast media receiver 128 configured to receive broadcast transmissions sent by a broadcast system. The media receiver 128 is a radio or a television receiver, for example. The device may also comprise an antenna 214 connected to the media receiver 128. The device may also comprise a single antenna connected both to the communication unit 210 and the media receiver 128. The device also typically comprises a memory 216 for storing e.g. telephone numbers, communication parameters, broadcast receiver parameters, calendar data and other user-specific data. The memory may be realized with memory circuits or units or with detachable memory cards.

The media device is not restricted to the above example. The device may also comprise other components not described above and not all above mentioned components are required in the invention. The media device may be a personal computer, a personal digital assistant, terminal equipment or any other device comprising required communication facilities.

Figure 3A:
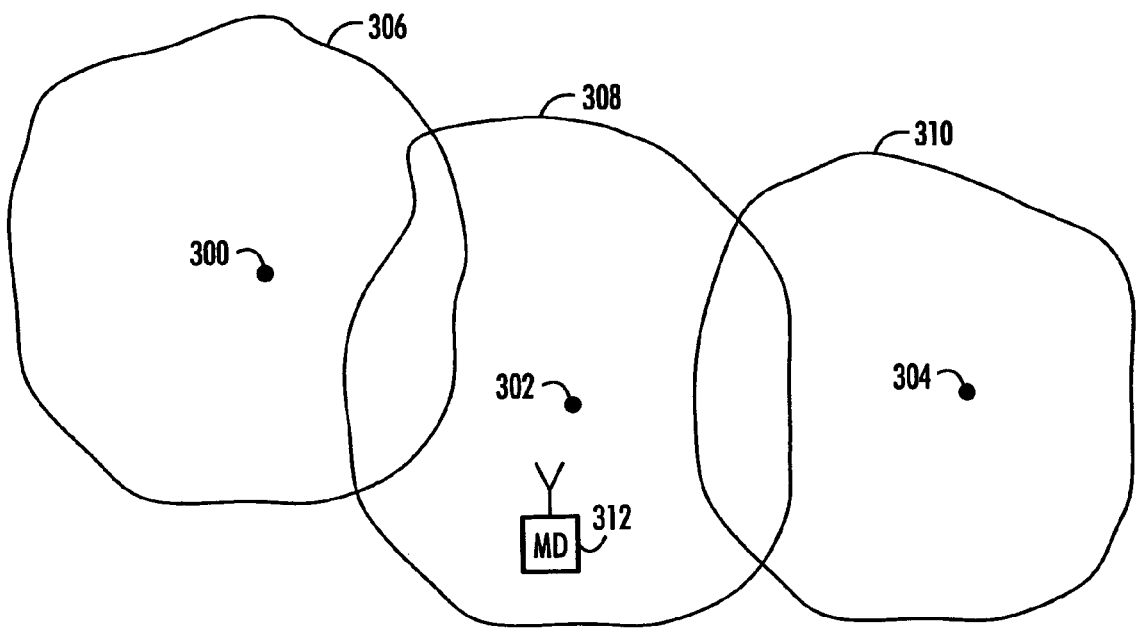
FIGS. 3A and 3B illustrate an example where a broadcast media stream is transmitted on different locations using different frequencies.
Figure 3B:
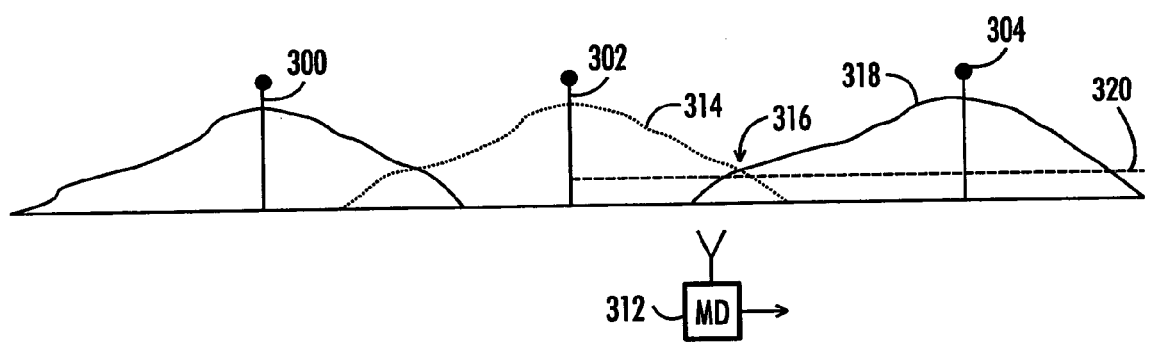

FIGS. 3A and 3B illustrate an example of a situation where a broadcast media stream is transmitted in different locations using different frequencies. In FIGS. 3A and 3B, three broadcast transmitter sites 300, 302, 304 are shown. Transmitters at each site 300, 302, 304 have a respective coverage area 306, 308, 310. The coverage areas are partly overlapping. To reduce interference, transmitters serving adjacent areas use different frequencies. In such a case, assume that the transmitter at the site 300 is transmitting the broadcast media stream using frequency f1, the transmitter at the site 302 is transmitting the broadcast media stream using frequency f2, and the transmitter at the site 304 is transmitting the broadcast media stream using frequency f3. Thus, the same broadcast media stream is transmitted on three frequencies f1, f2, f3 and these frequencies may be called parallel frequencies.

Assume that a mobile user with a media device 312 is in the coverage area 308 of the transmitter at the site 302. The media device is configured to receive the broadcast media stream transmitted by the transmitter at the site 302 using frequency f2. The media device is also receiving over a radio interface of a cellular telecommunication system, a service transmission associated with the broadcast media stream. The cellular telecommunication system comprises base stations as explained in connection with FIG. 1, and the structure of the telecommunication system is not shown in FIG. 3A due to simplicity. The coverage areas of the base stations may be different compared to the coverage areas of the broadcast media transmitters, as is known to one skilled in the art.

The service transmission received by the media device 312 comprises information about frequencies used to transmit the broadcast media stream in different locations. In an embodiment, the service transmission comprises information about frequencies used in adjacent geographical locations. Thus, while receiving broadcast transmission on frequency f2, the media device knows that in adjacent geographical locations the same media stream is transmitted using frequencies f1 and f3.

In an embodiment, the service transmission comprises information about the geographical locations where each frequency is used, and information about which locations are adjacent to each other.

Referring to FIG. 1, the information about parallel frequencies and adjacent locations may be stored in the server 124. In an embodiment, one or more servers may be operationally connected to a cellular radio system and to a broadcast system transmitting a broadcast media stream. The servers store information about frequencies used to transmit the broadcast media stream in different locations, and information about frequencies used in adjacent geographical locations, and transmit over the radio interface of the cellular telecommunication system a service transmission associated with the broadcast media stream, the service transmission comprising information about the frequencies.

The media device may store the information about the frequencies in a memory. Thus, a continuous connection to the server transmitting the information is unnecessary.

Again referring to FIGS. 3A and 3B, assume that the user with the media device 312 is traveling towards the site 310. FIG. 3B illustrates the signal strengths of the transmitters as a function of distance from the transmitters. For example, the signal strength 314 of the transmitter at the site 302 is at its strongest in the vicinity of the transmitter. As the media device travels towards the site 304, the signal strength of the transmitter using frequency f2 gradually drops as the distance between the transmitter and the media device grows. In a given point 316, the signal strength 318 from the transmitter at the site 304 using frequency f3 is stronger.

The media device 312 receives the transmission of the transmitter at the site 302. It continuously measures the signal strength. In an embodiment, the media device 312 is configured to compare the measured signal strength of the broadcast media transmission at frequency f2 to a predetermined signal strength threshold level 320. The threshold may be selected in such a manner that the reception quality experienced by the user of the media device is still good. Also other criteria may be used, as is known to one skilled in the art. If the measured signal strength exceeds the threshold no need exists to change the frequency.

If the measured signal strength does not exceed the threshold value, it can be assumed that the reception quality experienced by the user of the media device will soon deteriorate. In an embodiment, the media device is configured to measure the signal strength at least at one other frequency used for transmission of the media transmission. The frequency or frequencies to be measured may be selected on the basis of the information included in the service associated with the broadcast media stream. For example, if the service transmission comprises information about frequencies used in adjacent geographical locations, only those frequencies are measured.

Returning to the example of FIG. 3B, as the media device 312 moves towards the site 310, at a certain point the measured signal strength of the transmission at frequency f2 drops below the threshold 320. When this occurs, the media device is configured to measure the signal strengths of transmission at parallel frequencies f1 and f3, which it knows to be in use in adjacent geographical locations. Measuring transmission at frequency f1 does not produce a good result but the signal strength of the transmission at frequency f3 is better than the signal strength of the transmission at frequency f2. In this case, the media device switches the reception of the media transmission to frequency f3. The user does not necessarily notice the change. During the measurements of frequencies f1 and f3, a slight pause may occur in the reception, as the reception of f2 is interrupted. However, as the number of frequencies to be measured is limited the interruption is acceptable.

Situations may occur where the information included in the associated service is inaccurate. For example, information about the adjacent frequencies may not be available. In such a case, the media device may need to scan all known parallel frequencies.

Figure 4:
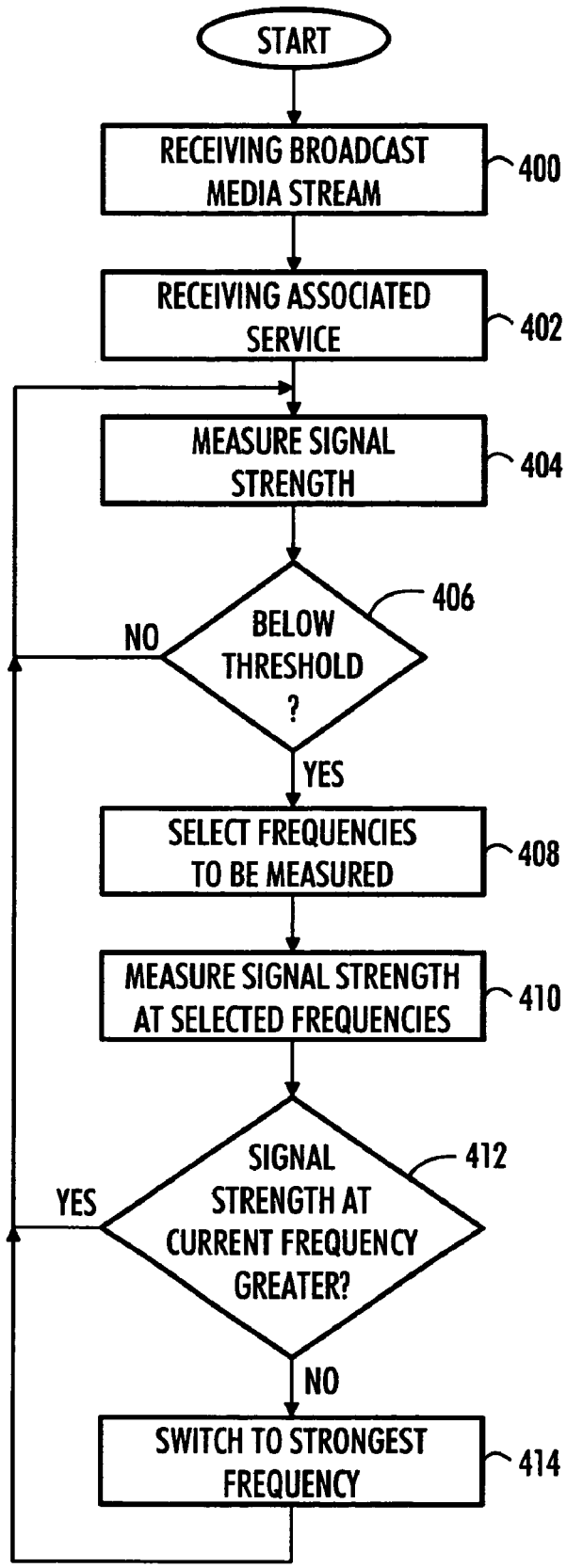
FIG. 4 is a flowchart illustrating an embodiment of the invention.

FIG. 4 is a flowchart illustrating an embodiment of the invention. In step 400, a media device receives a broadcast media stream transmitted by a broadcast system at a given frequency.

In step 402, the media device receives, over a radio interface of a cellular telecommunication system, a service transmission associated with the broadcast media stream, the service transmission comprising information about the frequencies used to transmit the broadcast media stream in different locations. The media device may store this information. In an embodiment, the media device does not receive the information at this stage, but retrieves the frequency information from a memory when the information is needed.

In step 404, the media device measures the signal strength of the broadcast media transmission at the frequency the media transmission is received.

In step 406, the media device compares the measured signal strength of the broadcast media transmission at the frequency the media transmission is received to a predetermined threshold value.

If the measured strength is greater than the threshold, the process continues from step 404.

Otherwise, in step 408 the media device selects other frequencies to be measured. The frequency or frequencies to be measured may be selected on the basis of the geographical locations where each frequency is used or on the basis of the adjacency of the geographical locations where each frequency is used.

In step 410, the media device measures the signal strength of the broadcast media transmission at least at one other frequency used for transmitting the media transmission.

In step 412, the media device compares the measured signal strengths.

If the measured signal strength of the current frequency is below the signal strength of some other measured frequency, in step 414, the media device switches the reception of the media transmission to the frequency with the best signal strength.

The embodiments of the invention may be realized in an electronic device comprising a communication unit for communicating with a cellular telecommunication system and a broadcast media receiver and a controller. The controller may be configured to perform at least some of the steps described in connection with the flowchart of FIG. 4 and in connection with FIGS. 3A and 3B. The embodiments may be implemented as a computer program comprising instructions for executing a computer process for enhancing use of a media device configured to receive a broadcast media stream transmitted by a broadcast system at a given frequency, the process comprising: receiving over a radio interface of a cellular telecommunication system, a service transmission associated with the broadcast media stream, the service transmission comprising information about the frequencies used to transmit the broadcast media stream in different locations; measuring the signal strength of the broadcast media transmission at the frequency the media transmission is received and at least at one other frequency used for transmission of the media transmission, comparing the measured signal strengths; switching the reception of the media transmission to another frequency if the signal strength at said frequency is stronger than the signal strength at the current frequency.

The computer program may be stored on a computer program distribution medium readable by a computer or a processor. The computer program medium may be, for example, but is not limited thereto, an electric, magnetic or semiconductor system or device. The medium may include at least one of the following media: a computer readable medium, a program storage medium, a record medium, a computer readable memory, a random access memory, an erasable programmable read-only memory, a computer readable software distribution package, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
   receiving, in a media device, a broadcast media stream transmitted by a broadcast system at a given frequency;
   receiving, in the media device, over a radio interface of a cellular telecommunication system, a service transmission associated with the broadcast media stream, the service transmission comprising information about frequencies used to transmit the broadcast media stream in different locations;
   measuring signal strength of the broadcast media transmission at the frequency the media transmission is received and at least at one other frequency used for transmission of the media transmission;
   comparing the measured signal strengths; and
   switching the reception of the media transmission to another frequency if the signal strength at said frequency is stronger than the signal strength at the current frequency.

2. The method of claim 1, further comprising:
   comparing the measured signal strength of the broadcast media transmission at the frequency the media transmission is received to a predetermined threshold value, and
   measuring signal strength of the broadcast media transmission at least at one other frequency if the measured signal strength is below the threshold value.

3. The method of claim 1, further comprising:
   the service transmission comprising information about geographical locations where each frequency is used, and information about which locations are adjacent to each other, and
   selecting at least one other frequency on the basis of the information.

4. The method of claim 1, further comprising: storing in a memory of the media device information about frequencies used in adjacent geographical locations, and selecting at least one other frequency on the basis of the information.

5. The method of claim 1, further comprising:
   storing in a memory of the media device information about all frequencies used for transmission of the media transmission in a country.

6. The method of claim 1, further comprising:
   receiving a power up command;
   tuning to a frequency used for the reception of a broadcast media stream before last occasion of shutting down the device,
   determining that the frequency is not used for the transmission of the broadcast media stream,
   measuring signal strengths of frequencies stored in the memory of the device,
   and if none of the frequencies is used for the transmission of the broadcast media stream, requesting for a frequency update.

7. A media device comprising:
   a receiver configured to receive a broadcast media stream transmitted by a broadcast system;
   a transceiver configured to communicate with a cellular telecommunication system and to receive a service transmitted over a radio interface of the cellular telecommunication system, the service being associated with the broadcast media stream and comprising information about the frequencies used to transmit the broadcast media stream in different locations;
   a memory for storing frequency information;
   a controller connected to the receiver, transceiver and the memory, and configured to measure signal strength of the broadcast media transmission at the frequency the media transmission is received and at least at one other frequency used for transmission of the media transmission, compare the measured signal strengths and to switch the reception of the media transmission to another frequency if the signal strength at said frequency is greater than the signal strength at the current frequency.

8. The media device of claim 7, wherein
   the transceiver is further configured to receive a service transmitted over a radio interface of the cellular telecommunication system, the service being associated with the broadcast media stream and comprising information about geographical locations where each frequency is used and information about which locations are adjacent to each other, and wherein
   the controller is further configured to select at least one other frequency on the basis of the information.

9. The media device of claim 7, further comprising a memory for storing information about frequencies used in adjacent geographical locations, and wherein the controller is configured to select at least one other frequency on the basis of the information.

10. A media device comprising:
    receiving means for receiving a broadcast media stream transmitted by a broadcast system;
    communication means for communicating with a cellular telecommunication system and for receiving a service transmitted over a radio interface of the cellular telecommunication system, the service being associated with the broadcast media stream and comprising information about frequencies used to transmit the broadcast media stream in different locations;
    memory means for storing frequency information; and
    controlling means, connected to the receiving means, communication means and the memory means, for measuring signal strength of the broadcast media transmission at the frequency the media transmission is received and at least one other frequency used for transmission of the media transmission, for comparing the measured signal strengths and for switching the reception of the media transmission to another frequency if the signal strength at said frequency is greater than the signal strength at the current frequency.

11. A computer readable medium encoding a computer program of instructions for executing a computer process, the process comprising:

receiving, over a radio interface of a cellular telecommunication system, a service transmission associated with a received broadcast media stream transmitted by a broadcast system at a given frequency, the service transmission comprising information about frequencies used to transmit the broadcast media stream in different locations;

measuring signal strength of the broadcast media transmission at the frequency the media transmission is received and at least at one other frequency used for transmission of the media transmission;

comparing the measured signal strengths; and switching the reception of the media transmission to another frequency if the signal strength at said frequency is greater than the signal strength at the current frequency.

12. The computer readable medium of claim 11, the medium including at least one of the following media: a program storage medium, a record medium, a computer readable memory, a computer readable software distribution package, and a computer readable compressed software package.

* * * * *